United States Patent
Shieh

(12) 
(10) Patent No.: US 6,398,378 B1
(45) Date of Patent: Jun. 4, 2002

(54) SANITARY MIRROR ASSEMBLY HAVING A ROTATABLE STRUCTURE

(76) Inventor: Ming Don Shieh, No. 18, Tou Ren Lane, Tou Ren Li, Lu Gang Town, Chang Hua Hsien (TW), 505

( * ) Notice: Subject to any disclaimer, the term of this patent is extended or adjusted under 35 U.S.C. 154(b) by 0 days.

(21) Appl. No.: 09/846,393

(22) Filed: May 2, 2001

(51) Int. Cl.[7] ............................................... G02B 7/182
(52) U.S. Cl. ..................... 359/879; 359/880; 359/881; 359/882; 359/838
(58) Field of Search ................................. 359/879, 880, 359/881, 882, 838, 841, 842, 843, 844, 850, 865

(56) References Cited

U.S. PATENT DOCUMENTS

| | | | |
|---|---|---|---|
| 3,730,612 A | * 5/1973 | Arroyo et al. .............. | 350/305 |
| 3,988,058 A | * 10/1976 | Chaney et al. ............... | 350/298 |
| 4,856,888 A | * 8/1989 | Wahl ........................... | 350/639 |
| 5,237,459 A | * 8/1993 | Strauss ........................ | 359/863 |
| 5,458,486 A | * 10/1995 | Ballard ........................ | 433/30 |
| 6,062,697 A | * 5/2000 | Bryant et al. ............... | 359/841 |
| 6,130,790 A | * 10/2000 | Tu ............................... | 359/841 |

* cited by examiner

*Primary Examiner*—Mohammad Y Sikder
(74) *Attorney, Agent, or Firm*—Charles E. Baxley

(57) ABSTRACT

A mirror device includes a base for attaching onto a supporting wall and having a stud, a socket secured onto the stud and having a ball, a barrel rotatably engaged onto the ball, and a mirror secured onto the barrel and rotatable and adjustable relative to the base, for allowing the mirror to be directed toward any selected angular position relative to the base. The socket includes a shank coupled to the ball with a neck. A lock sleeve is rotatably engaged onto the ball and threaded to the barrel and has a peripheral flange rotatably engaged between the ball and the shank.

6 Claims, 5 Drawing Sheets

# SANITARY MIRROR ASSEMBLY HAVING A ROTATABLE STRUCTURE

BACKGROUND OF THE INVENTION

1. Field of the Invention

The present invent ion relates to a mirror assembly, and more particularly to a mirror assembly for sanitary or dressing or washing purposes.

2. Description of the Prior Art

Typical mirrors for sanitary or dressing or washing purposes are solidly secured in a cabinet or directly secured to the wall of the sanitary or the dressing or the washing rooms, and are normally parallel to the wall, and may not be rotated or adjusted relative to the wall, such that the mirror may not be suitably used when the users are not located in front of the mirror. The users may have to prepare and to hold another mirror when they are not or may not be located in front of the mirror. However, when one of the two hands of the user holds the additional mirror, it will be difficult or inconvenient for the user to conduct the other washing or dressing operations with the other hand only.

The present invention has arisen to mitigate and/or obviate the afore-described disadvantages of the conventional mirrors for sanitary or dressing purposes.

SUMMARY OF THE INVENTION

The primary objective of the present invention is to provide a mirror assembly for sanitary or dressing or washing purposes, including an adjustable or a foldable or a rotatable structure for allowing the mirror assembly to be directed to various angles or directions and for allowing the users to use the mirror assembly without standing in front of the mirror assembly.

In accordance with one aspect of the invention, there is provided a mirror assembly for attaching onto a supporting wall, the mirror assembly comprising a base for attaching onto the wall, the base including a stud extended therefrom, a socket secured onto the stud and including a ball provided thereon, a barrel rotatably engaged onto the ball of the socket, and a mirror secured onto the barrel and rotated in concert with the barrel relative to the base, for allowing the mirror to be directed toward any selected angular position relative to the base.

The stud is a threaded stud, the socket includes a shank extended from the ball and threaded onto the threaded stud for securing the shank onto the base.

One or more fasteners may further be provided and threaded through the shank and the stud for solidly securing the shank onto the stud of the base.

The socket includes a neck portion formed between the ball and the shank and having an outer diameter smaller than that of the ball and the shank.

A locking device may further be provided for locking the barrel to the socket and includes an outer thread formed on the barrel, a lock sleeve rotatably engaged onto the ball and having an inner thread for threading with the outer thread of the barrel and having a peripheral flange extended radially inward therefrom and rotatably engaged between the ball and the shank, the peripheral flange includes an inner diameter smaller than that of the ball and the shank and greater than that of the neck portion of the socket.

One or more fasteners may further be provided and threaded through the lock sleeve and the barrel for solidly securing the barrel onto the lock sleeve.

The barrel includes an extension extended therefrom and having an outer thread formed thereon, the mirror assembly further includes a frame having an orifice formed therein for receiving the extension of the barrel and having a peripheral rib extended radially inward of the orifice thereof and engaged with the extension of the barrel, and a lock nut threaded with the outer thread of the extension of the barrel and received in the orifice of the frame for securing the frame to the barrel, the mirror is secured onto the frame for allowing the mirror to be directed toward any selected angular position relative to the base by a rotatable engagement of the frame and the barrel relative to the socket and the base.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
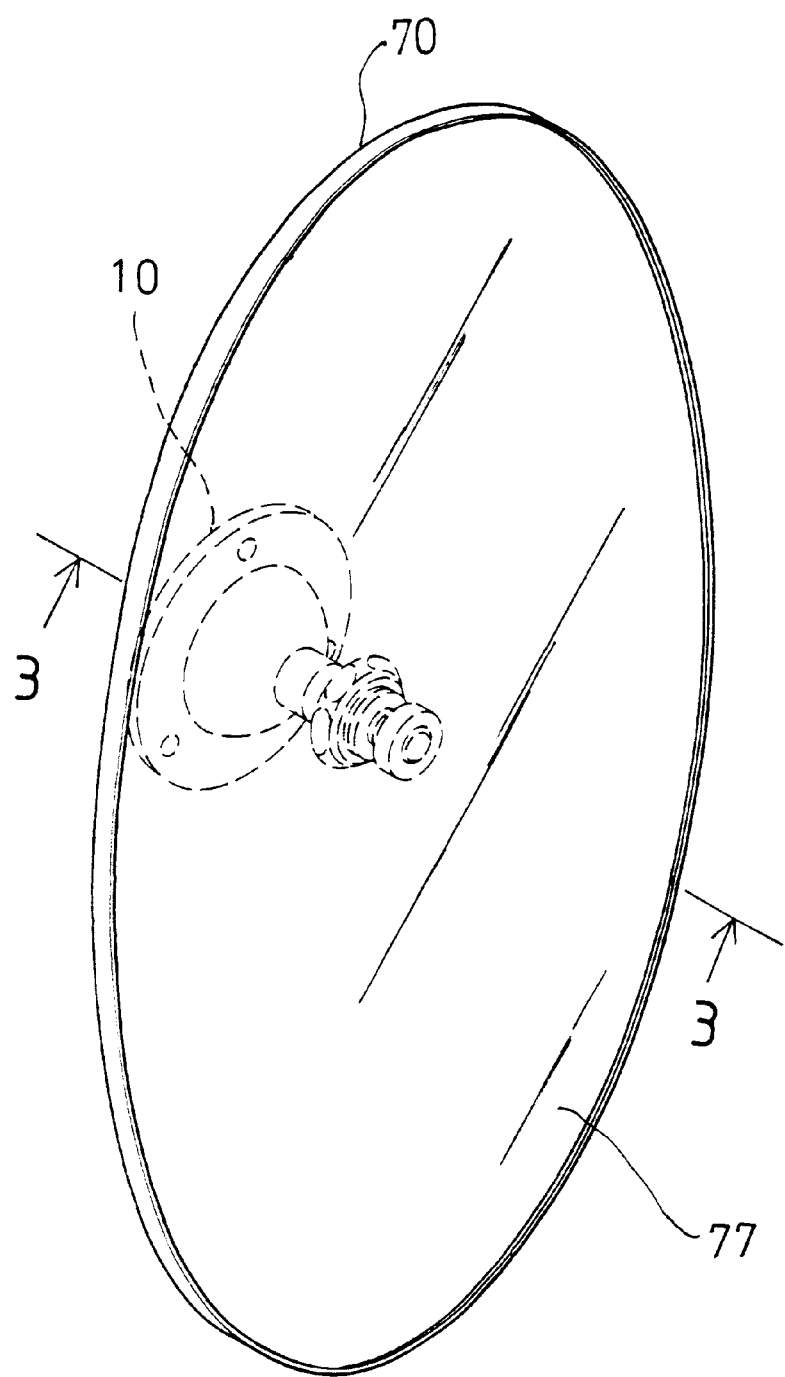
FIG. 1 is a perspective view of a mirror assembly in accordance with the present invention.
Figure 2:
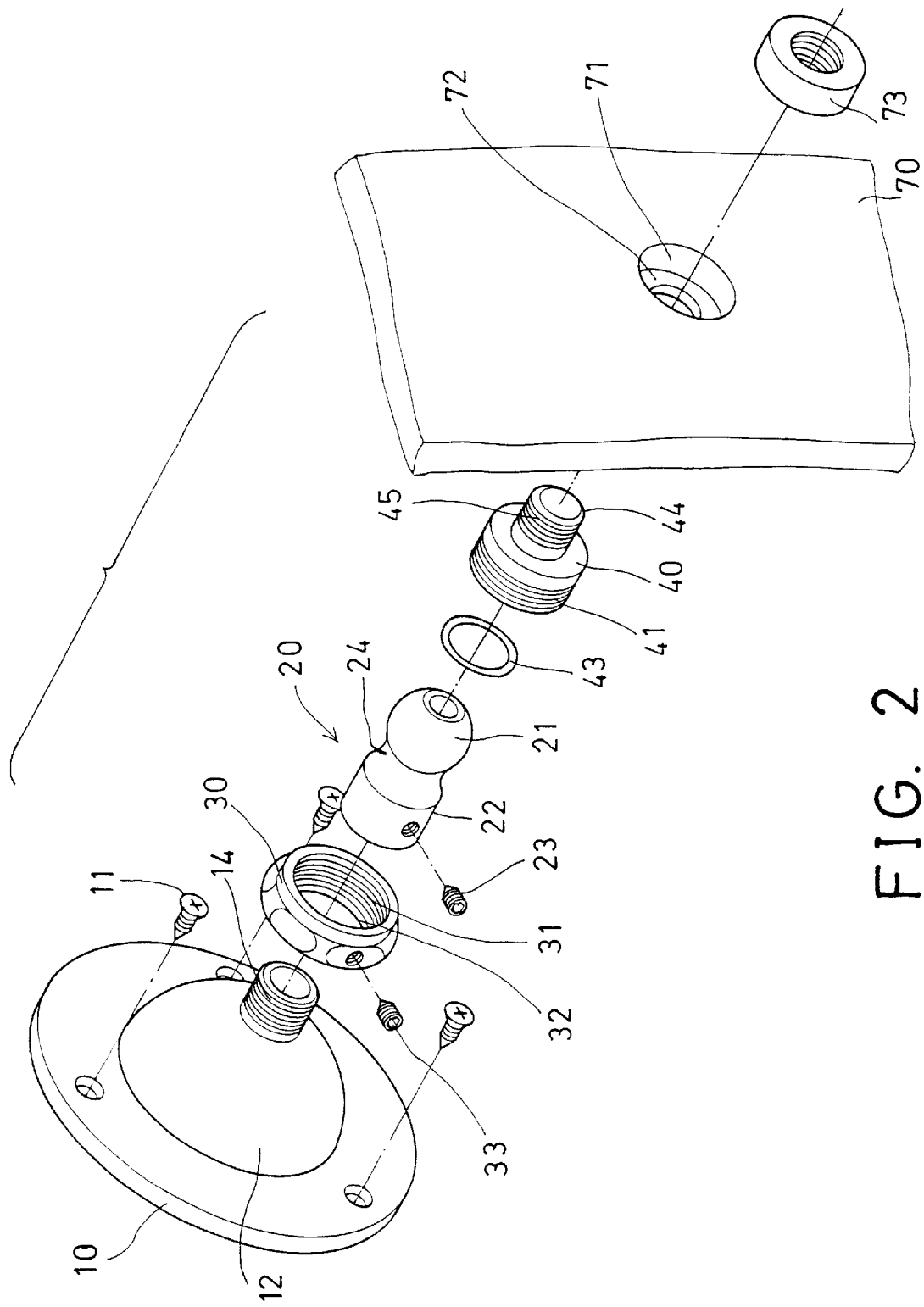
FIG. 2 is a partial exploded view of the mirror assembly.
Figure 3:
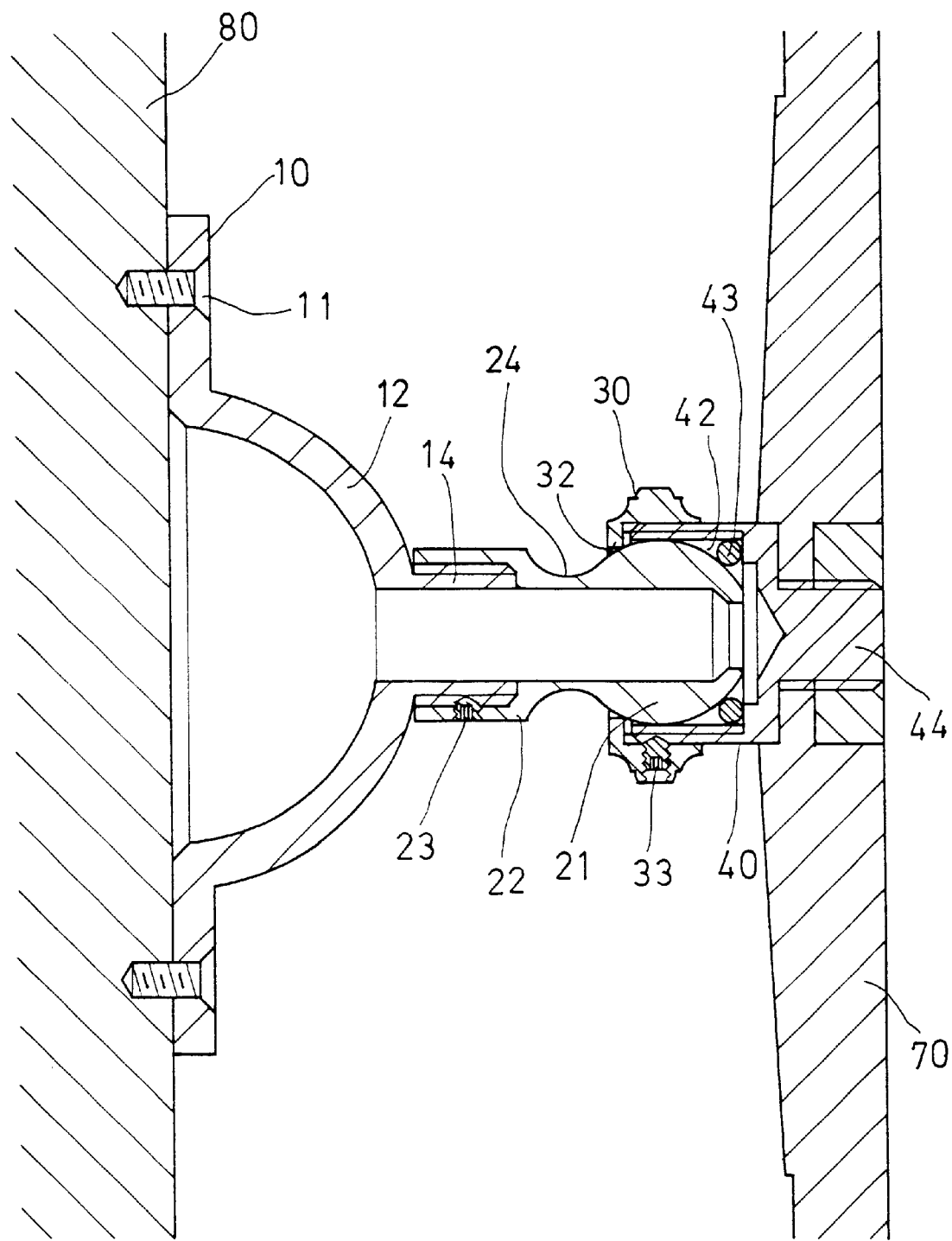
FIG. 3 is a partial cross sectional view taken along lines 3—3 of FIG. 1.

Referring to the drawings, and initially to FIGS. 1–3, a mirror assembly in accordance with the present invention comprises a base 10 for attaching or securing onto the supporting wall 80 of the cabinet or of the wall in the sanitary or the dressing or the washing room with the fasteners 11 or the like. The base 10 includes a convex bulge 12 extended therefrom, and includes a threaded stud 14 extended from the bulge 12.

A ball or universal socket 20 includes a ball 21 and a shank 22 coupled together with a neck portion 24. The shank 22 includes an inner thread provided therein for threading with or onto the threaded stud 12 of the base 10 and for securing onto the base 10. One or more fasteners 23 may further be provided for threading through the shank 22 and for engaging with the stud 14 for further solidly securing the socket 20 to the base 10. The neck portion 24 includes an outer diameter smaller than that of the ball 21 and that of the shank 22.

A lock sleeve 30 is rotatably engaged onto the ball 21 of the socket 20, and includes an inner thread 31 formed therein, and includes a peripheral flange 32 extended radially inward therefrom for engaging with the neck portion 24 of the socket 20. The peripheral flange 32 includes an inner diameter smaller than that of the balls 21 and that of the shank 22 and greater than that of the neck portion 24 of the socket 20 such that the lock sleeve 30 may be rotatably engaged onto the socket 20 and will not be disengaged from the socket 20.

A barrel 40 includes a chamber 42 formed therein for rotatably receiving the ball 21 of the socket 20, and includes an outer thread 41 formed on the outer peripheral portion thereof for threading with the inner thread 31 of the lock sleeve 30, such that the ball 21 of the socket 20 may be stably retained within the barrel 40. One or more fasteners 33 may further be provided for solidly securing the lock sleeve 30 to the barrel 40. A sealing ring 43 may be engaged between the barrel 40 and the ball 21 for making a water or an air tight seal therebetween. The barrel 40 includes an extension 44 extended forward therefrom and having an outer thread 45 formed thereon.

A frame 70 includes an orifice 71 formed therein for receiving the extension 44 of the barrel 40, and includes a peripheral rib 72 extended radially inward of the orifice 71 thereof for engaging with the extension 44 of the barrel 40 and for preventing the frame 70 from rotating relative to the barrel 40. A lock nut 73 is threaded with the outer thread 45 of the extension 44 and engaged in the orifice 71 of the frame 70 for solidly securing the frame 70 to the barrel 40. The mirror assembly includes a mirror 77 (FIGS. 1, 4) attached or secured onto the front portion of the frame 70.

Figure 4:
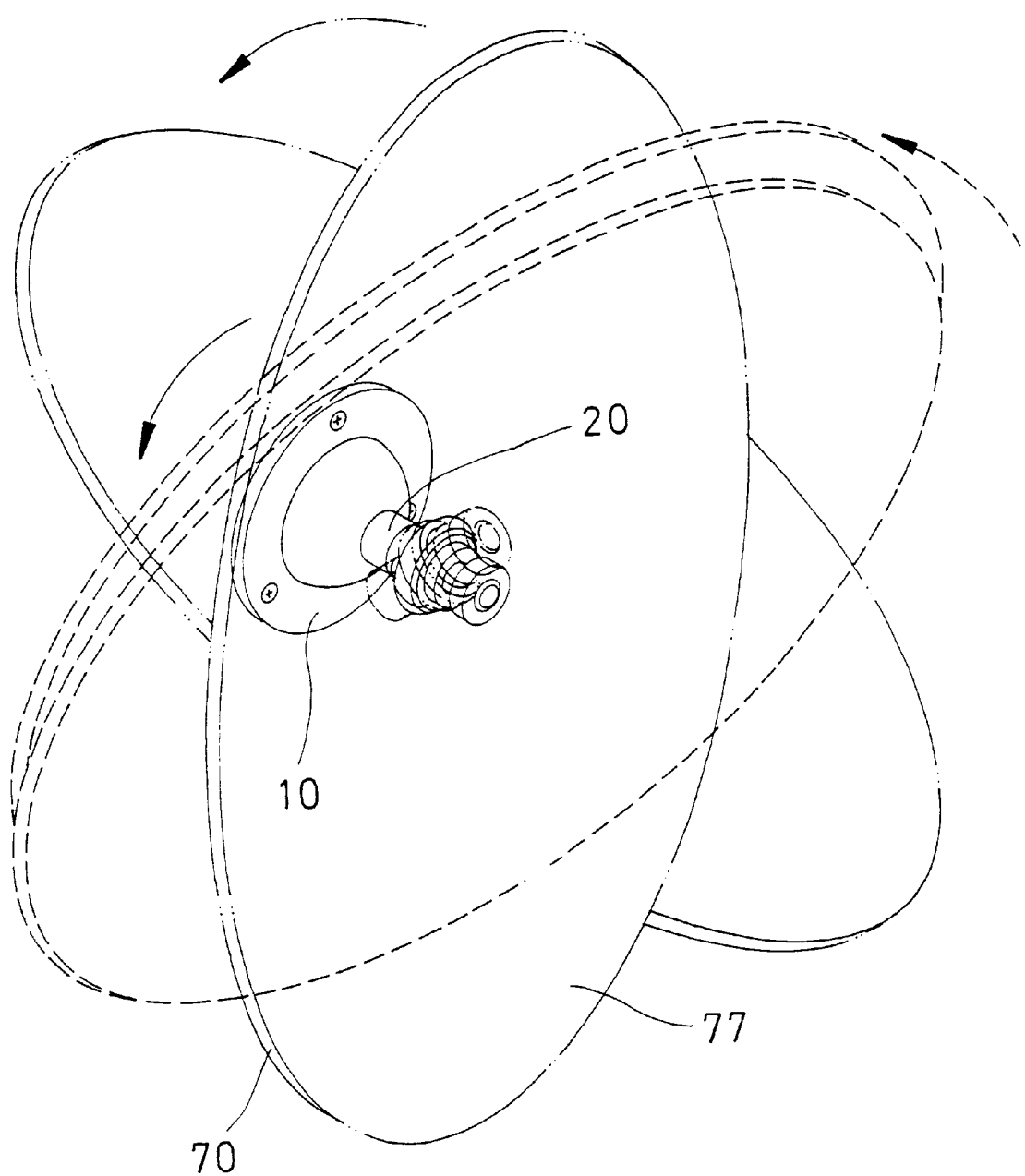
FIG. 4 is a perspective view illustrating the operation of the mirror assembly.
Figure 5:
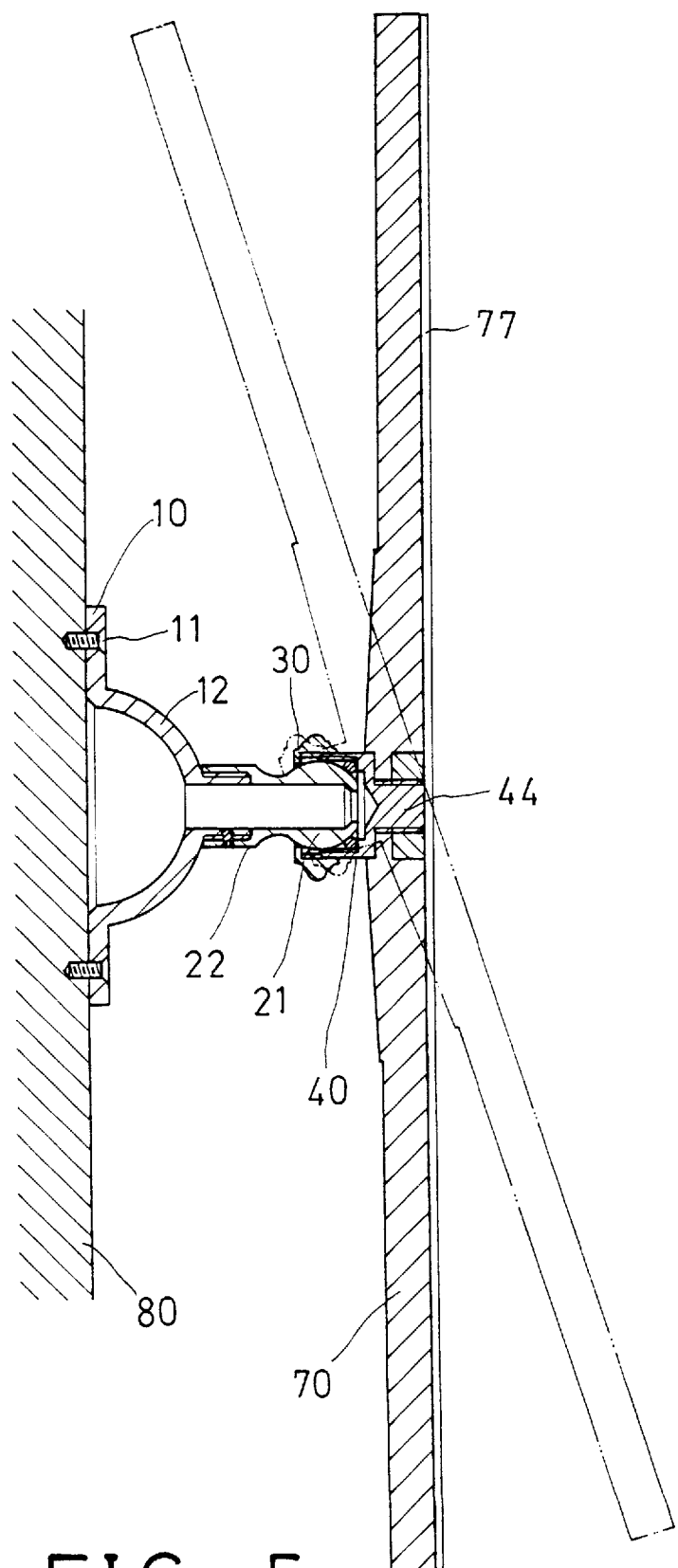
FIG. 5 is a partial cross sectional view similar to FIG. 3, illustrating the operation of the mirror assembly.

In operation, as shown in FIGS. 4 and 5, the barrel 40 may be rotated relative to the base 10 and the wall 80 (FIGS. 3, 5) with the rotatable engagement of the barrel 40 onto the ball 21, such that the mirror 77 and the frame 70 may be easily rotated relative to the base 10 to any suitable angular direction and to be directed toward the users who are not or who may not be stood in front of the mirror assembly.

The prior mirrors for the sanitary or the dressing or the washing rooms are parallel to the wall and may not be rotated or adjusted relative to the wall, such that the users have to prepare and to hold another mirror. With the mirror assembly in accordance with the present, the mirror 77 may be easily directed toward the users who need not to prepare and to hold the other mirrors.

Accordingly, the mirror assembly in accordance with the present invention are provided for sanitary or dressing or washing purposes and includes an adjustable or a foldable or a rotatable structure for allowing the mirror assembly to be directed to various angles or directions and for allowing the users to use the mirror assembly without standing in front of the mirror assembly.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A mirror assembly for attaching onto a supporting wall, said mirror assembly comprising:
    base for attaching onto the wall, said base including a stud extended therefrom;
    a socket secured onto said stud and including a ball provided thereon,
    a barrel rotatably engaged onto said ball of said socket, and
    a mirror secured onto said barrel and rotated in concert with said barrel relative to said base, for allowing said mirror to be directed toward any selected angular position relative to said base;
    wherein said stud is a threaded stud, said socket includes a shank extended from said ball and threaded onto said threaded stud for securing said shank onto said base.

2. The mirror assembly according to claim 1 further comprising at least one fastener threaded through said shank and said stud for solidly securing said shank onto said stud of said base.

3. The mirror assembly according to claim 2, wherein said socket includes a neck portion formed between said ball and said shank and having an outer diameter smaller than that of said ball and said shank.

4. The mirror assembly according to claim 3 further comprising means for locking said barrel to said socket.

5. The mirror assembly according to claim 4, wherein said locking means includes an outer thread formed on said barrel, a lock sleeve rotatably engaged onto said ball and having an inner thread for threading with said outer thread of said barrel and having a peripheral flange extended radially inward therefrom and rotatably engaged between said ball and said shank, said peripheral flange includes an inner diameter smaller than that of said ball and said shank and greater than that of said neck portion of said socket.

6. The mirror assembly according to claim 5 further comprising at least one fastener threaded through said lock sleeve and said barrel for solidly securing said barrel onto said lock sleeve.

* * * * *